(12) United States Patent
Cheng

(10) Patent No.: US 10,481,320 B2
(45) Date of Patent: Nov. 19, 2019

(54) CLAMPING METHOD AND DISPLAY DEVICE

(71) Applicants: HKC Corporation Limited, Shenzhen, Guangdong (CN); Chongqing HKC Optoelectronics Technology Co., Ltd., Chongqing (CN)

(72) Inventor: Jiahe Cheng, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 15/743,664

(22) PCT Filed: Dec. 20, 2017

(86) PCT No.: PCT/CN2017/117312
§ 371 (c)(1),
(2) Date: Jan. 10, 2018

(87) PCT Pub. No.: WO2019/071819
PCT Pub. Date: Apr. 18, 2019

(65) Prior Publication Data
US 2019/0113676 A1 Apr. 18, 2019

(30) Foreign Application Priority Data
Oct. 13, 2017 (CN) .......................... 2017 1 0954354

(51) Int. Cl.
*G02B 6/00* (2006.01)
*F21V 8/00* (2006.01)

(52) U.S. Cl.
CPC ................................ *G02B 6/0088* (2013.01)

(58) Field of Classification Search
CPC ......... G02F 1/133615; G02F 1/133603; G02F 1/133608; G02F 2001/133311–133334;
(Continued)

(56) References Cited

U.S. PATENT DOCUMENTS

2009/0284987 A1* 11/2009 Chen ................. G02F 1/133608
362/631
2013/0314638 A1* 11/2013 Ahn .................. G02F 1/133308
349/58
(Continued)

*Primary Examiner* — Anabel Ton

(57) ABSTRACT

Disclosed are a clamping method and a display device. The method includes providing a plastic frame, a backplate, an optical film and a light guide plate, and the plastic frame including a first clamping portion having a fixed column, and the backplate including a second clamping portion; forming a through hole at a position corresponding to the second clamping portion and the fixed column, and the through hole having a size bigger than the fixed column; installing the optical film and the light guide plate between the first clamping portion and the second clamping portion, and passing the fixed column through the through hole; and hot melting the part of the fixed column extending out of the through hole to form a hot melt portion wrapped around the through hole, so that the first and second clamping portions clamp the optical film and the light guide plate securely.

12 Claims, 6 Drawing Sheets

(58) Field of Classification Search
CPC ..... G09F 2013/1881; G09F 2013/0445; G02B 6/0088
See application file for complete search history.

(56) References Cited

U.S. PATENT DOCUMENTS

| | | | |
|---|---|---|---|
| 2014/0132885 A1* | 5/2014 | Li | G02B 6/0011 349/62 |
| 2014/0152940 A1* | 6/2014 | Wang | G02B 6/0011 349/62 |
| 2015/0036301 A1* | 2/2015 | Ooishi | G09F 13/04 361/749 |
| 2015/0049424 A1* | 2/2015 | Wu | G02F 1/133308 361/679.21 |
| 2019/0049764 A1* | 2/2019 | Chen | G02F 1/1339 |

\* cited by examiner

CLAMPING METHOD AND DISPLAY DEVICE

FIELD OF INVENTION

The present disclosure relates to the field of display technology, in particular to a clamping method and a display device.

BACKGROUND OF INVENTION

With the advantages of good viewing effect and beautiful appearance, curved surface display devices become increasingly more popular. However, the conventional curved surface display devices primarily rely on a plastic frame and a backplate to clamp an optical film and a light guide plate. Under the rebound effect of the curve surface of the optical film and light guide plate, the rebound of the light guide plate, plastic frame and optical film may occur easily to result in an uneven brightness of the screen and seriously affect the application of the curved surface display devices.

SUMMARY OF INVENTION

Therefore, it is a primary objective of the present disclosure to provide a clamping method and a display device to overcome the aforementioned drawback of the conventional curved surface display device whose optical film and light guide plate may be rebounded and cause an uneven brightness of the screen.

To achieve the aforementioned and other objectives, the present disclosure provides a clamping method, including the steps of: providing a plastic frame, a backplate, an optical film and a light guide plate, wherein the plastic frame includes a first clamping portion, and the first clamping portion has a fixed column disposed thereon, and the backplate includes a second clamping portion; forming a through hole on the second clamping portion and at a position corresponding to the fixed column, wherein the through hole has a size greater than the size of the fixed column; installing the optical film and the light guide plate between the first clamping portion and the second clamping portion, and passing the fixed column through the through hole; and performing a hot melt processing of a part of the fixed column extending out from the through hole to form a hot melt portion wrapped around the through hole, so that the first clamping portion and the second clamping portion securely clamp the optical film and the light guide plate.

To achieve the aforementioned and other objectives, the present disclosure also provides a display device including a display panel and a backlight module, and the backlight module includes: a plastic frame, including a first clamping portion, wherein the first clamping portion has a fixed column disposed thereon; a backplate, including a second clamping portion, wherein the second clamping portion has a through hole formed at a position corresponding to the fixed column; an optical film; and a light guide plate, wherein the optical film and the light guide plate are installed between the first clamping portion and the second clamping portion; wherein, the fixed column is passed through the through hole, and the part of the fixed column extending out from the through hole is hot melted to form a hot melt portion wrapped around the through hole, so that the first clamping portion and the second clamping portion clamp the optical film and the light guide plate securely.

To achieve the aforementioned and other objectives, the present disclosure further provides a display device including a display panel and a backlight module, and the backlight module includes:

a plastic frame, being a one-piece structure, and including a first clamping portion and a first border portion, wherein the first clamping portion has a fixed column disposed thereon, and the first border portion and the first clamping portion are formed with a certain angle and the first border portion has a latch hole;

a backplate, including a second clamping portion and a second border portion, wherein the second clamping portion has a through hole formed thereon and disposed at a position corresponding to the fixed column, and the second border portion and the second clamping portion are formed with a certain angle, and the second border portion has a latch member disposed at a position corresponding to the latch hole;

an optical film and a light guide plate, both being installed between the first clamping portion and the second clamping portion;

wherein, the fixed column is passed through the through hole, and the part of the fixed column extending out from the through hole is hot melted to form a hot melt portion wrapped around the through hole, so that the first clamping portion and the second clamping portion clamp the optical film and the light guide plate securely, and the latch member is passed through the latch hole to define a latch connection.

With the technical solution in accordance with some embodiments of this disclosure, the fixed column is disposed on the first clamping portion of the plastic frame, and the through hole is formed at a position corresponding to the backplate, and the fixed column is passed through an end of the through hole and hot melted to form the hot melt portion, so that the plastic frame and the backplate are fixed securely to clamp the optical film and the light guide plate in the backlight interior and prevent any abnormal screen display caused by the rebound of the stress of the curved surface.

BRIEF DESCRIPTION OF THE DRAWINGS

The above and other objects, features and advantages of this disclosure will become apparent from the following detailed description taken with the accompanying drawings. Only some embodiments of the present disclosure have been illustrated in the drawings, but it should be pointed out that many other modifications are conceivable within the scope of the following claims.

DESCRIPTION OF THE EMBODIMENTS

Figure 1:
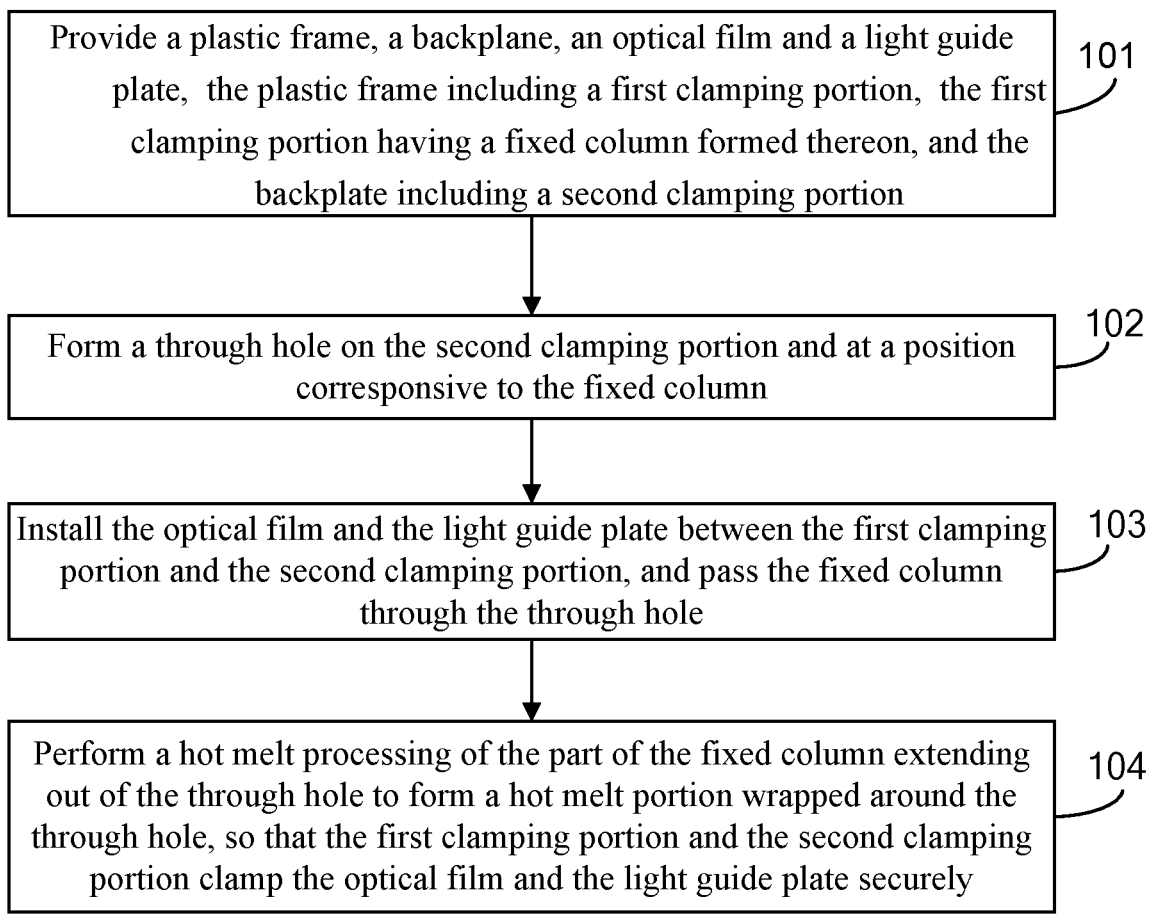
FIG. 1 is a flow chart of a clamping method in accordance with an embodiment of the present disclosure.

The technical solution of this disclosure will become apparent with the description of embodiments accompanied with the illustration of related drawings. It is noteworthy that same numerals in the drawings are used to represent respective components of this disclosure respectively. Obviously, these embodiments are provided for the purpose of illustrating the present disclosure, but not intended for limiting the disclosure. Based on these embodiments, people having ordinary skill in the art may obtain all other embodiments without paying any creative labor, and all embodiments are intended to be covered by the scope of this disclosure.

It should be understood that the terms "comprise" and "include" used in this specification and its attached claims refer to the existence of a technical characteristic, the whole, a procedure, a step, an operation, an element and/or a component, but not excluding the existence or addition of the set of one or more technical characteristics, the whole, one or more procedures, steps, operations, elements and/or components.

It is understood that the terminology used in the specification of this disclosure is just used for describing exemplary embodiments only, but not intended for limiting this disclosure. Unless otherwise specified, the terminology "a", "an" or "one" used in the specification and its attached claims not just refers to the singular form only, but it also refers to the plural form, and the terminology "and/or" refers to one or more of the listed item, or any combination of the above, or the combination of all possibilities.

With reference to FIG. 1 for a flow chart of a clamping method in accordance with an embodiment of this disclosure, the method includes the following steps S101-S104. The method is applied for clamping an optical film and a light guide plate of a display device.

S101: Provide a plastic frame, a backplate, an optical film and a light guide plate.

Wherein, the plastic frame includes a first clamping portion, and the first clamping portion has a fixed column disposed thereon, and the backplate includes a second clamping portion. Preferably, the plastic frame is a one-piece structure.

In a specific implementation, the plastic frame includes a first clamping portion, and the first clamping portion has a fixed column disposed thereon, and the fixed column and the plastic frame are integrally formed, and the quantity of fixed columns may be set according to the actual size of the display device. The backplate includes a second clamping portion, and the first clamping portion and second clamping portion are provided for clamping the optical film and the light guide plate. The sizes of the plastic frame, backplate, optical film and light guide plate match with one another, and the shape of these four components depends on the display device, but all these arrangements are not intended for limiting the scope of this disclosure.

S102: Form a through hole on the second clamping portion and at a position corresponding to the fixed column.

Wherein, the through hole has a size greater than the size of the fixed column.

In a specific implementation, the second clamping portion of the backplate has a through hole formed at a position corresponding to the fixed column, and the size of the through hole must be greater than the size of the fixed column in order to pass the fixed column through the through hole.

S103: Install the optical film and the light guide plate between the first clamping portion and the second clamping portion, and pass the fixed column through the through hole.

In the process of assembling the display device in accordance with a specific implementation, the optical film and the light guide plate are installed between the first clamping portion and the second clamping portion. Now, the fixed column of the first clamping portion is passed through the corresponding through hole of the second clamping portion.

S104: Perform a hot melt processing of the part of the fixed column extending out of the through hole to form a hot melt portion wrapped around the through hole, so that the first clamping portion and the second clamping portion clamp the optical film and the light guide plate securely.

In a specific implementation, the part of the fixed column extending out of the through hole is hot melted to form a hot melt portion which is wrapped around the through hole. The size of the hot melt portion is greater than the size of the through hole, so that the relative movement between the first clamping portion and the second clamping portion can be limited to achieve the effect of clamping the optical film and the light guide plate by the first clamping portion and the second clamping portion.

With the technical solution in accordance with the embodiments of this disclosure, the fixed column is disposed on the first clamping portion of the plastic frame, and the through hole is formed at a position corresponding to the backplate, and the fixed column is passed through an end of the through hole and hot melted to form the hot melt portion, so that the plastic frame and the backplate are fixed securely to clamp the optical film and the light guide plate in the backlight interior and prevent any abnormal screen display caused by the rebound of the stress of the curved surface.

Figure 2:
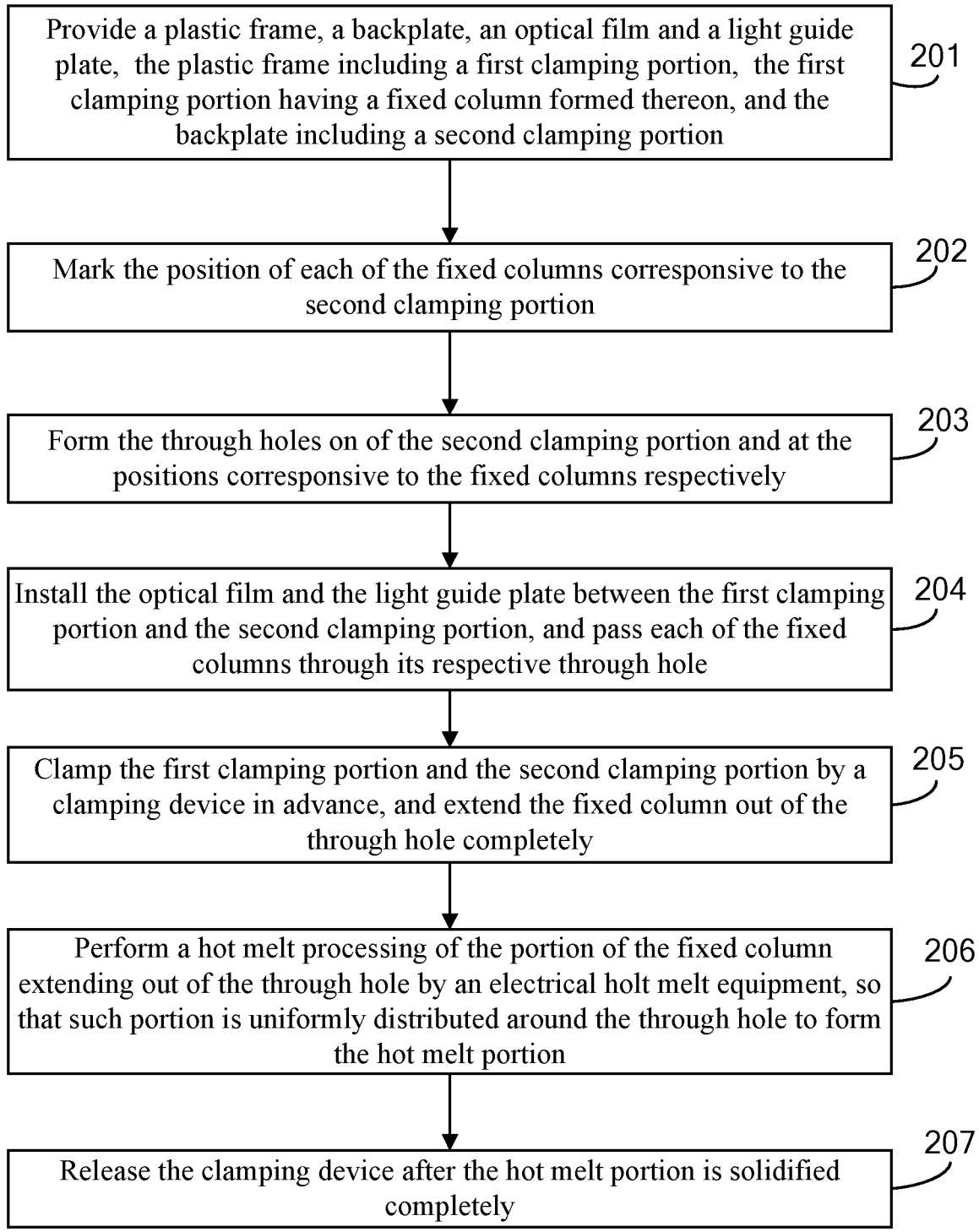
FIG. 2 is a flow chart of a clamping method in accordance with another embodiment of the present disclosure.

With reference to FIG. 2 for a flow chart of a clamping method in accordance with an embodiment of this disclosure, the method includes the following steps S201-S207. This method is applied for clamping an optical film and a light guide plate of a display device.

S201: Provide a plastic frame, a backplate, an optical film and a light guide plate.

Wherein, the plastic frame includes a first clamping portion, and the first clamping portion has a fixed column disposed thereon, and the backplate has a second clamping portion.

In a specific implementation, the plastic frame includes a first clamping portion, and the first clamping portion has a plurality of fixed columns, and the fixed columns and the plastic frame are integrally formed. The quantity of fixed columns may be set according to the actual size of the display device. The backplate includes a second clamping portion, and the first clamping portion and the second clamping portion are provided for clamping the optical film and the light guide plate. The plastic frame, backplate, optical film and light guide plate are in the sizes matched with each other, and the shape of these four components depends on the display device, but all these arrangements are not intended for limiting the scope of this disclosure.

The first clamping portion includes the plurality of fixed columns, and the fixed columns are uniformly distributed around the first clamping portion. Preferably, the quantity of fixed columns is equal to 2~20, depending on the size of the display device.

Preferably, the fixed column is made of a thermoplastic material.

S202: Mark the position of each of the fixed columns corresponding to the second clamping portion.

In a specific implementation, the position of the second clamping portion corresponding to each of the fixed columns is marked in advance. For example, such position is marked by a marker or a pen, so as to improve the accuracy and efficiency of forming the through hole at its desired position.

S203: Form the through holes on of the second clamping portion and at the positions corresponding to the fixed columns respectively.

Wherein, the size of the through hole is greater than the size of the fixed column.

In a specific implementation, the second clamping portion of the backplate has a through hole formed at a position corresponding to each of the fixed columns, and the size of the through hole must be greater than the size of the fixed column in order to pass the fixed column through the through hole.

Further, the fixed column is a cylindrical structure, and the corresponding through hole is a circular structure.

S204: Install the optical film and the light guide plate between the first clamping portion and the second clamping portion, and pass each of the fixed columns through its respective through hole.

In the process of assembling the display device in accordance with a specific implementation, the optical film and the light guide plate are installed between the first clamping portion and the second clamping portion. Now, the fixed column of the first clamping portion is passed through the through hole corresponding to the second clamping portion.

S205: Clamp the first clamping portion and the second clamping portion by a clamping device in advance, and extend the fixed column out of the through hole completely.

In a specific implementation, a clamping device is used to clamp the first clamping portion and the second clamping portion securely in advance, so as to ensure the clamping effect and extend the fixed column all the way to the exterior of the through hole, and then the part of the fixed column extending out of the through hole is hot melted to form a hot melt portion. The hot melt portion is provided for fixing the relative positions of the first clamping portion and the second clamping portion in a secured manner to ensure the clamping effect of the optical film and the light guide plate.

S206: Perform a hot melt processing of the portion of the fixed column extending out of the through hole by an electrical holt melt equipment, so that such portion is uniformly distributed around the through hole to form the hot melt portion.

In a specific implementation, the electrical hot melt equipment is used to hot melt the part of the fixed column extending out of the through hole and hot melt such part around the through hole to form the hot melt portion. On one hand, the hot melt portion looks beautify. On the other hand, the strength of the hot melt portion is ensured.

S207: Release the clamping device after the hot melt portion is solidified completely.

In a specific implementation, when the hot melt portion is not solidified completely, its strength is not resumed completely. If the clamping device is released at that time, the rebound of the curved surface may deform the hot melt portion. Therefore, it is necessary to wait till the hot melt portion is solidified completely in an embodiment of this disclosure. After the hot melt portion is shaped, the clamping device is released.

With the technical solution of this embodiment, the fixed column is disposed on the first clamping portion of the plastic frame, and the through hole is formed on the backplate, and the fixed column is passed through an end of the through hole and hot melted to form a hot melt portion, so that the plastic frame and the backplate are fixed securely, to clamp the optical film and the light guide plate in the backlight interior and prevent any abnormal screen display caused by the rebound of the stress of the curved surface.

Figure 3:
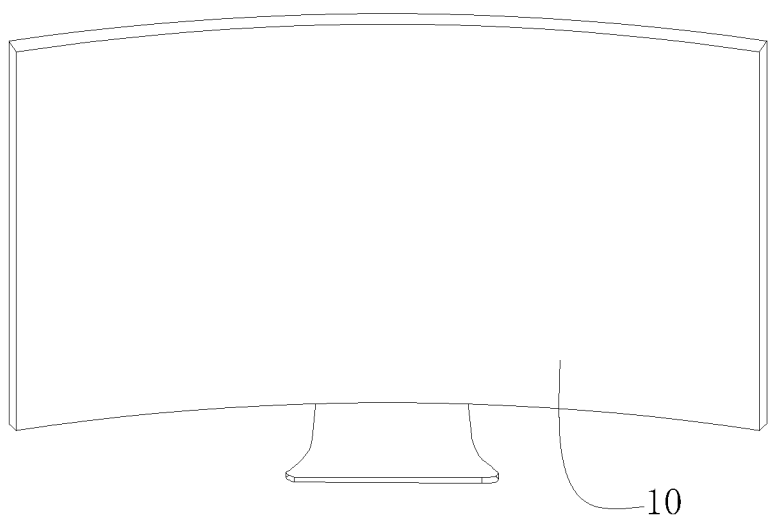
FIG. 3 is a schematic view of a display device in accordance with an embodiment of the present disclosure.
Figure 4:
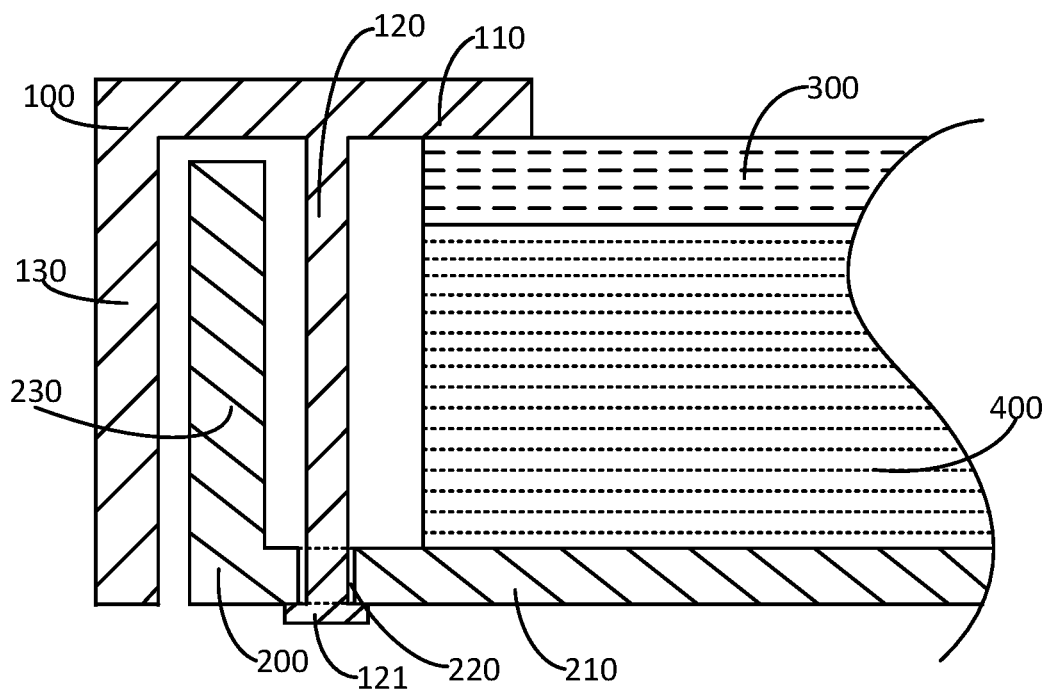
FIG. 4 is a schematic view of a display device in accordance with another embodiment of the present disclosure.

With reference to FIGS. 3 and 4 for a display device in accordance with an embodiment of this disclosure, the display device includes a display panel 10 and a backlight module, and the backlight module includes a plastic frame 100, a backplate 200, an optical film 300 and a light guide plate 400. Each component is described below:

The plastic frame 100 includes a first clamping portion 110, and the first clamping portion 110 has a fixed column 120 disposed thereon. Specifically, the fixed column 120 is disposed on an inner side of the first clamping portion 110, and the fixed column 120 is perpendicular to the plane where the first clamping portion 110 is situated, and the plastic frame 100 is a one-piece structure. The backplate 200 includes a second clamping portion 210, and the second clamping portion 210 has a through hole 220 formed at a position corresponding to the fixed column 120. The optical film 300 and the light guide plate 400 are installed between the first clamping portion 110 and the second clamping portion 210. The fixed column 120 is passed through the through hole 220, and the part of the fixed column 120 extending out of the through hole 220 is hot melted to form a hot melt portion 121 which is wrapped around the through hole 220, so that the first clamping portion 110 and the second clamping portion 210 clamp the optical film 300 and the light guide plate 400 securely.

Preferably, the fixed column 120 is a cylindrical structure, and the corresponding through hole 220 is a circular structure.

It is noteworthy that the size of the hot melt portion 121 is greater than the size of the through hole 220, so that the hot melt portion 121 can limit the relative movement between the first clamping portion 110 and the second clamping portion 210, and the first clamping portion 110 and the second clamping portion 210 can clamp the optical film 300 and the light guide plate 400 securely.

With the technical solution of this embodiment, the fixed column 120 is disposed on the first clamping portion 110 of the plastic frame 100, and the corresponding through hole 220 is formed on the backplate 200, and the fixed column 120 is passed through an end of the through hole 220 and hot melted to form a hot melt portion 121, so that the plastic frame 100 and the backplate 200 are fixed securely to clamp the optical film 300 and the light guide plate 400 in the backlight interior and prevent any abnormal screen display caused by the rebound of the stress of the curved surface.

Figure 7:
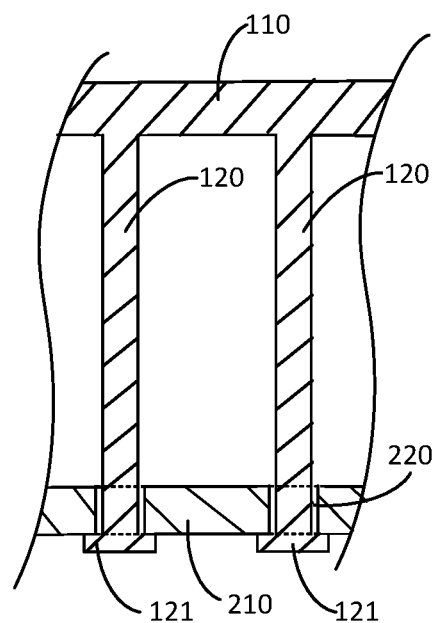
FIG. 7 is a cross-sectional view taken along line A-A in FIG. 6.

In an embodiment, such as this embodiment, as shown in FIG. 7, the first clamping portion 110 includes the plurality of fixed columns 120 uniformly distributed around the first clamping portion 110. On one hand, the first clamping portion 110 and the second clamping portion 210 have a more uniform clamping force, and on the other hand, the product is more aesthetic.

Preferably, the quantity of fixed columns is 2~20, depending on the size of the display device.

Further, the plastic frame 100 is manufactured by a plastic injection molding process, and the plastic frame 100 is a one-piece structure.

Further, the fixed column 120 is made of a thermoplastic material.

Figure 5:
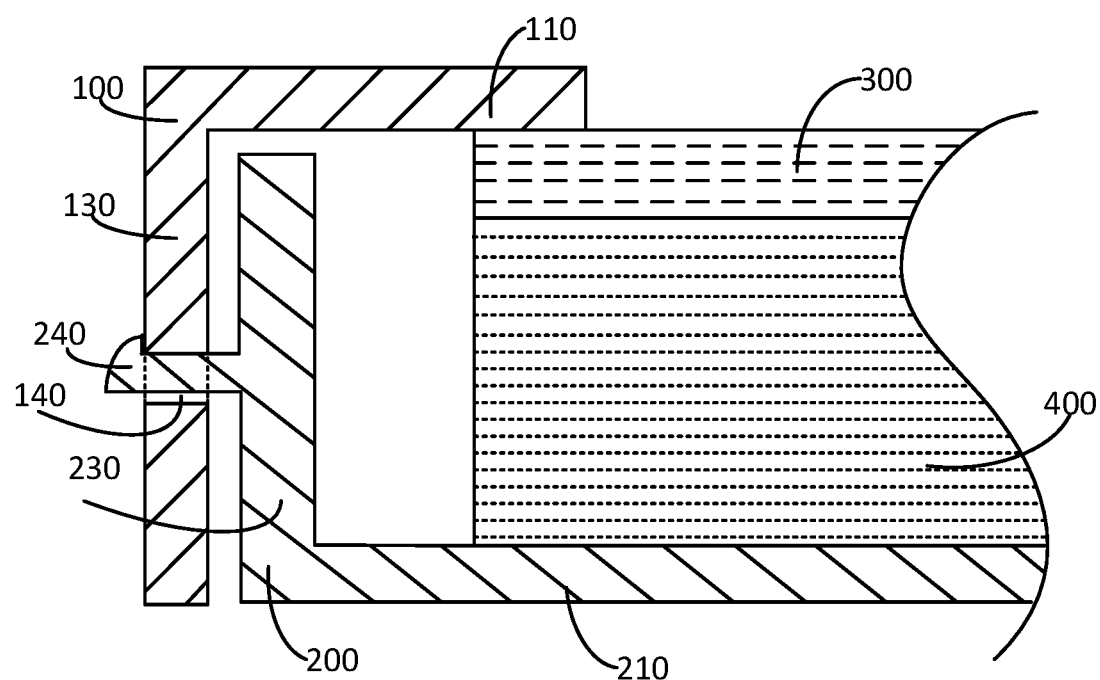
FIG. 5 is a schematic view of a display device in accordance with a further embodiment of the present disclosure.

In an embodiment such as this embodiment as shown in FIG. 5, the plastic frame 100 includes a first border portion 130 with a certain angle formed with the first clamping portion 110, and the backplate 200 includes a second border portion 230 with a certain angle formed with the second clamping portion 210, and the first border portion 130 has a latch hole 140 formed thereon, and the second border portion 230 has a latch member 240 configured to be corresponding to the latch hole 140, and the latch member 240 is passed through the latch hole 140 to define a latch connection.

The latch hole 140 is formed on the first border portion 130 of the plastic frame 100, and the latch member 240 is disposed on the second border portion 230 of the backplate 200 and configured to be corresponding to the latch hole 140, and the latch member 240 is passed through the latch hole 140 to form a latch structure, so as to increase the clamping force of the plastic frame 100 and backplate 200 to clamp the optical film 300 and the light guide plate 400 and assure the clamping effect.

Figure 8:
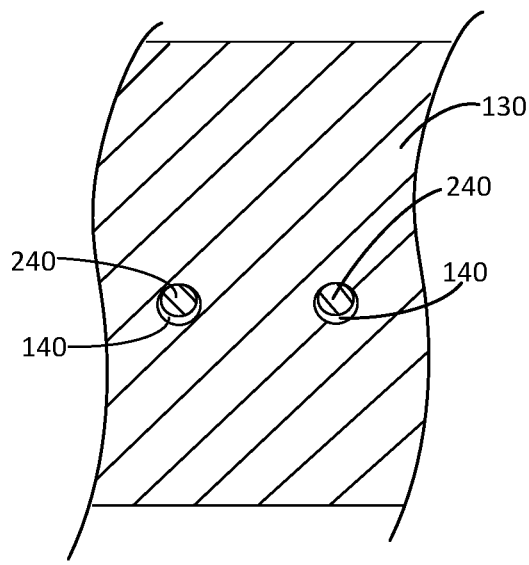
FIG. 8 is a cross-sectional view taken along line B-B in FIG. 6.

Further, as shown in FIG. 8, the first border portion 130 has a plurality of latch holes 140, and the latch hole 140 is uniformly distributed around the first border portion 130. Since the latch hole 140 is uniformly distributed around the border portion, therefore the action of each latch member is more uniform, and the product is more aesthetic. Preferably, the quantity of latch holes 140 is 2~20 depending on the size of the display device.

The second border portion 230 of the backplate 200 has a plurality of corresponding latch members 240, and each latch member 240 is passed through its respective latch hole 140 to define a multi-latch connection.

Further, the first clamping portion 110 is perpendicular to the first border portion 130. The second clamping portion 210 is perpendicular to the second border portion 230.

Figure 6:
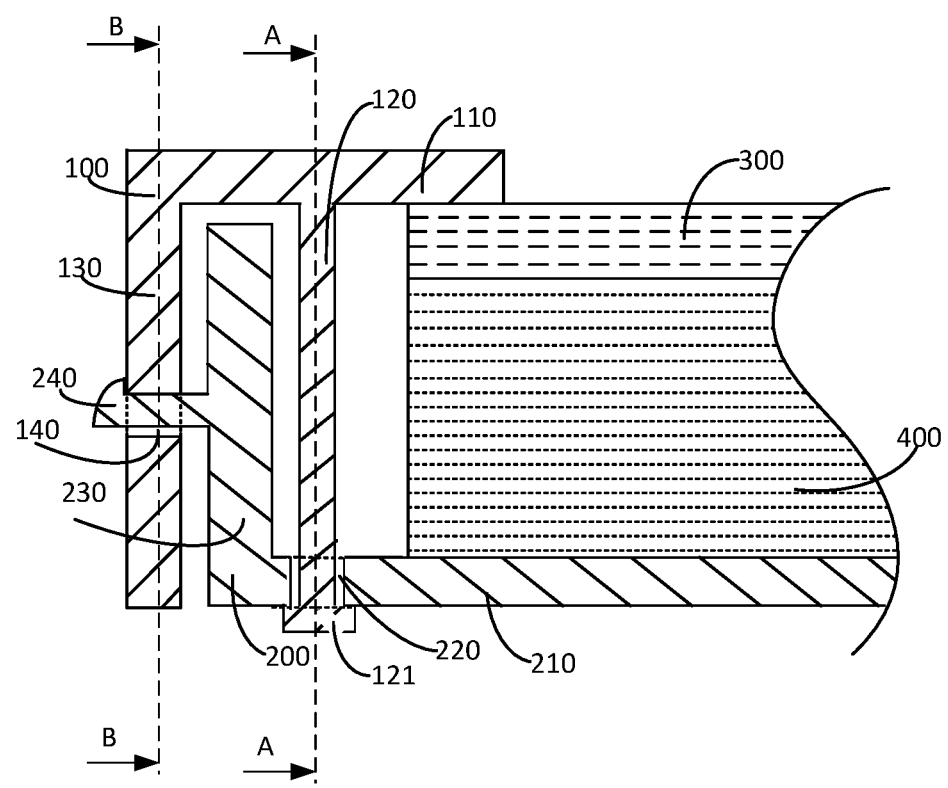
FIG. 6 is a schematic view of a display device in accordance with another embodiment of the present disclosure.

With reference to FIG. 6 for a display device in accordance with another embodiment of this disclosure, the display device includes a display panel 10 and a backlight module. The backlight module includes a plastic frame 100, a backplate 200, an optical film 300 and a light guide plate 400. The plastic frame 100 includes a first clamping portion 110, and the first clamping portion 110 has a fixed column 120 disposed thereon. The backplate 200 includes a second clamping portion 210, and the second clamping portion 210 has a through hole 220 formed at a position corresponding to the fixed column 120. The optical film 300 and the light guide plate 400 are installed between the first clamping portion 110 and the second clamping portion 210. The fixed column 120 is passed through the through hole 220, and a part of the fixed column 120 is extended out of the through hole 220 and hot melted to form a hot melt portion 121 which is wrapped around the through hole 220, so that the first clamping portion 110 and the second clamping portion 210 clamp the optical film 300 and the light guide plate 400 securely. The plastic frame 100 includes a first border portion 130 with a certain angle formed with the first clamping portion 110, and the backplate 200 includes a second border portion 230 with a certain angle formed with the second clamping portion 210. The first border portion 130 has a latch hole 140 formed thereon, and the second border portion 230 has a latch member 240 configured to be corresponding to the latch hole 140, and the latch member 240 is passed through the latch hole 140 to define a latch connection.

In the embodiment of this disclosure, the first clamping portion 110 of the plastic frame 100 has a fixed column 120 disposed thereon, and the backplate 200 has a corresponding through hole 220 formed thereon, and the fixed column 120 is passed through an end of the through hole 220 and hot melted into a hot melt portion 121, so that the plastic frame 100 and the backplate 200 are fixed securely. On the other hand, the latch structure disposed on the border portion of the plastic frame 100 and the backplate 200 further improves the locking force of the plastic frame 100 and the backplate 200, so that the plastic frame 100 and the backplate 200 are fixed securely to clamp the optical film 300 and the light guide plate 400 in the backlight interior and prevent any abnormal screen display caused by the rebound of the stress of the curved surface.

In an embodiment, the display panel of the display device may be a twisted nematic liquid crystal display (TN LCD) panel, an in-plane switching liquid crystal display (IPS LCD) panel, a multi-domain vertical alignment liquid crystal display (MVA LCD) panel, an organic light emitting diode (OLED) panel, a quantum-dot light emitting diode (QLED) panel, or any other display panel.

For simplicity, the embodiments of the method are described as a combination of a series of actions, but people having ordinary skill in the art should understand that this disclosure is not limited by the order of these actions. Based on this disclosure, some steps may be carried out in another order or carried out at the same time. In addition, the people having ordinary skill in the art should understand that the embodiments provided in this specification are embodiment, but the related actions are not mandatorily required in this disclosure.

In the aforementioned embodiments, an embodiment may focus at a particular point, and related description of other embodiments may be referred if the detail of other points has not been given in the embodiment.

The order of the steps of the embodiments of this disclosure method may be adjusted, combined, or deleted according to actual needs.

While the disclosure has been described by means of specific embodiments, numerous modifications and variations could be made thereto by those skilled in the art without departing from the scope and spirit of the disclosure set forth in the claims.

What is claimed is:

1. A display device, comprising:
    a display panel, and
    a backlight module, comprising:
    a plastic frame, comprising a first clamping portion, wherein the first clamping portion has a fixed column disposed thereon;
    a backplate, comprising a second clamping portion, wherein the second clamping portion has a through hole formed at a position corresponding to the fixed column;
    an optical film; and
    a light guide plate, wherein the optical film and the light guide plate are installed between the first clamping portion and the second clamping portion;
    wherein, the fixed column is passed through the through hole, and the part of the fixed column extending out from the through hole is hot melted to form a hot melt portion wrapped around the through hole, so that the first clamping portion and the second clamping portion clamp the optical film and the light guide plate securely.

2. The display device of claim 1, wherein the plastic frame comprises a first border portion formed at a certain angle with the first clamping portion, and the backplate comprises a second border portion formed at a certain angle with the second clamping portion, and the first border portion has a latch hole formed thereon, and the second border portion has a latch member disposed thereon and at a position corresponding to the latch hole, and the latch member is passed through the latch hole to define a latch connection.

3. The display device of claim 1, wherein the first clamping portion comprises a plurality of fixed columns disposed thereon, and the fixed columns are uniformly distributed around the first clamping portion.

4. The display device of claim 1, wherein the first border portion comprises a plurality of latch holes formed thereon, and the latch holes are uniformly distributed around the first border portion.

5. The display device of claim 1, wherein the fixed column is made of a thermoplastic material.

6. The display device of claim 2, wherein the first clamping portion is perpendicular to the first border portion.

7. The display device of claim 2, wherein the second clamping portion is perpendicular to the second border portion.

8. The display device of claim 1, wherein the plastic frame is a one-piece structure.

9. The display device of claim 3, wherein a quantity of the plurality of fixed columns disposed on the first clamping portion is 2~20.

10. The display device of claim 4, wherein a quantity of the plurality of latch holes of the first border portion is 2~20.

11. The display device of claim 1, wherein the fixed column is a cylindrical structure, and the through hole is a circular structure.

12. A display device, comprising:
a display panel, and
a backlight module, further comprising:
a plastic frame, being a one-piece structure, and comprising a first clamping portion and a first border portion, wherein the first clamping portion has a fixed column disposed thereon, and the first border portion and the first clamping portion are formed with a certain angle and the first border portion has a latch hole;
a backplate, comprising a second clamping portion and a second border portion, wherein the second clamping portion has a through hole formed thereon and disposed at a position corresponding to the fixed column, and the second border portion and the second clamping portion are formed with a certain angle, and the second border portion has a latch member disposed at a position corresponding to the latch hole;
an optical film and a light guide plate, both being installed between the first clamping portion and the second clamping portion;
wherein, the fixed column is passed through the through hole, and the part of the fixed column extending out from the through hole is hot melted to form a hot melt portion wrapped around the through hole, so that the first clamping portion and the second clamping portion clamp the optical film and the light guide plate securely, and the latch member is passed through the latch hole to define a latch connection.

\* \* \* \* \*